UNITED STATES PATENT OFFICE.

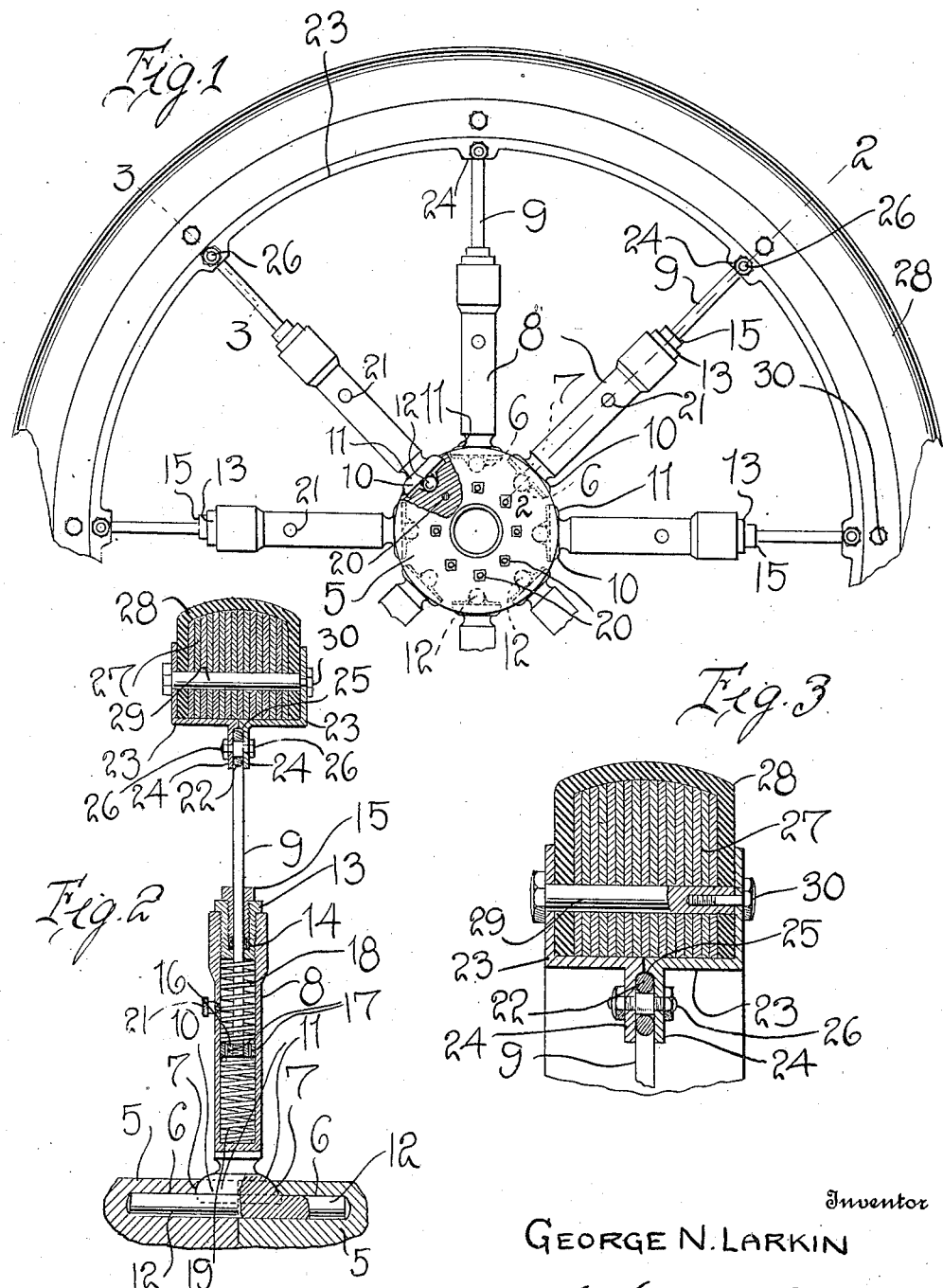

GEORGE N. LARKIN, OF NEW MARKET, ALABAMA.

RESILIENT WHEEL.

1,158,694.  Specification of Letters Patent.  Patented Nov. 2, 1915.

Application filed March 20, 1915. Serial No. 15,925.

*To all whom it may concern:*

Be it known that I, GEORGE N. LARKIN, a citizen of the United States, residing at New Market, in the county of Madison and State of Alabama, have invented certain new and useful Improvements in Resilient Wheels, of which the following is a specification, reference being had to the accompanying drawings.

This invention relates to resilient wheels and more particularly to that type of such devices wherein the cushioning means is embodied in the spoke construction of the wheel.

The invention has for its primary object to produce a wheel of the above character which is simple in its construction, strong and durable in practical use and highly efficient and reliable in operation.

The invention has for one of its more particular objects to provide an improved means for mounting the inner ends of the several spokes of the wheel in the wheel hub.

It is an additional object of my invention to provide a wheel construction having spokes consisting of inner and outer sections, the latter being provided with heads for reciprocatory movement in the inner spoke sections and cushioning springs arranged in the latter sections of the spokes upon opposite sides of the heads on the outer sections, said inner spoke sections being provided with means whereby the tension of the springs may be regulated or adjusted.

With the above and other objects in view, my invention consists in the novel features of construction, combination, and arrangement of parts to be hereinafter more fully described, claimed, and illustrated in the accompanying drawing, in which, Figure 1 is a fragmentary side elevation of a wheel partly in section, showing the preferred embodiment of the invention; Fig. 2 is a section taken on the line 2—2 of Fig. 1; Fig. 3 is an enlarged detail section taken on the line 3—3 of Fig. 1.

Referring in detail to the drawing, 5 designates the hub of the wheel which is constructed in two similar sections. Each of these hub sections is provided with a plurality of longitudinally extending sockets 6 which correspond in number to the number of the wheel spokes and open at one of their ends upon the opposed faces of the hub sections. At the outer end of each of the sockets 6, each hub section of the wheel is formed in its peripheral face with a semi-circular concave recess indicated at 7, the purpose of which will be hereinafter more fully pointed out.

Each spoke of the wheel consists of an inner section 8 and an outer section 9. The inner spoke section 8 is of hollow tubular construction, one end thereof being closed and formed with a disk or annular flange 10 having a convex peripheral face 11. This disk, in turn, is integrally formed upon the medial portion of a pivot rod or pin 12 which is disposed in a plane at right angles to the longitudinal axis of the spoke section 8. The outer end of the spoke section 8 is interiorly threaded to receive an adjustable sleeve 13, said sleeve being formed with a chamber to receive a suitable packing material indicated at 14 and having a nut 15 threaded in said chamber for engagement upon the packing 14. The outer section 9 of the wheel spoke is in the form of a cylindrical rod which has longitudinal sliding movement through the nut 15 and the inner end of the sleeve 13. This rod has a piston head 16 threaded upon its inner end and said head is provided with a series of openings 17 therein through which air may pass in the movement of the head in each direction. A coil spring, indicated at 18, is arranged upon the spoke rod 9 between the head 16 and the inner end of the sleeve 13, and a similar spring 19 is also arranged between the opposite face of the head 16 and the inner closed end of the hollow spoke section 8.

In assembling the spokes in the hub of the wheel, the pivot rods 12 are received in the hub sockets 6, the sections of the hub being moved in opposite directions upon the ends of the pivot rods and toward each other until their inner faces abut. The disks or flanges 10 on the inner ends of the spoke sections 8 are received in the opposed semi-circular recesses 7 in the hub sections, and the convex peripheral faces 11 of said disks have sliding contact with the concave walls of the recesses. The hub sections are secured together by means of bolts indicated at 20, which extend longitudinally therethrough. The hollow spoke section 8 is equipped with a suitable oil cup indicated at 21, whereby lubricating oil may be supplied to the interior of said spoke section to reduce friction between the sliding piston head 16 and the walls of the spoke sections to a minimum.

The outer end of the spoke section 9 terminates in an eye 22. The rim sections 23 of the wheel are provided at intervals with the inwardly projecting lugs 24 having recesses 25 in their opposed faces to receive the eyes 22 of the spoke sections 9. Pins or bolts 26 are disposed through the lugs 24 and the eyes 22 so as to connect the spoke sections 9 to the rim sections of the wheel for rocking or pivotal movement.

As clearly shown in Fig. 3 of the drawing, the wheel tire preferably consists of laminations of fiber, indicated at 27, such as wood blocks, and these laminations are covered by a heavy sheet of rubber composition material 28. The sides of this covering for the fiber laminations are engaged against the inner faces of the flanges on the rim sections, and the series of bolts 29 are transversely disposed through openings provided in the rim sections, the cover 28 and the fiber blocks 27. This bolt is interiorly threaded at one end to receive the securing stud or pin 30 which is engaged therein and provided with a head on one end for bearing engagement upon the flange of one of the rim sections.

From the foregoing description, the construction and several advantages of my invention will be readily seen. By mounting the ends of the spoke sections 8 and 9 in the hub and rim of the wheel, respectively, as above stated, circumferential movement of the rim and tire of the wheel with respect to the hub is permitted, the rods 12 rocking in the hub sections. By the provision of the disks having the convex faces 11, the limited rocking movement of the inner ends of the spokes which takes place will not result in the entrance of dust and dirt to the bearing sockets 6 in which the pivot rods 12 are engaged, as this disk will, at all times, effectively prevent the entrance of such foreign matter to the pivot rod sockets. Thus, friction is entirely eliminated and the proper rocking movement of the inner ends of the spoke sections 8 upon the hub without binding is assured. The eyes 22 on the ends of the outer spoke sections 9 are permitted a free turning movement upon the connecting pins or bolts 26 which connect the same to the wheel rim. When the wheel spokes are successively subjected to the load carried by the vehicle or the wheel passes over obstructions in the road, the outer spoke sections will be forced inwardly into the hollow inner sections 8 against the action of the springs 19, and upon the return or outward movement of the spoke sections 9, the springs 18 act as cushions therefor. Thus, all shocks or jars are completely absorbed in the wheel spokes and are not transmitted to the body of the vehicle. The tension of the springs 18 and 19 may be very easily and quickly regulated in accordance with the load carried by the vehicle, by the adjustment of the sleeves 13 on the outer ends of the spoke sections 8.

The several parts of my improved resilient wheel construction may be readily assembled or disassembled when necessary and, in view of the extreme simplicity of the device, it will be appreciated that the same is very strong and durable and not liable to get out of order.

While I have shown and described the preferred construction and arrangement of the several elements employed, it is to be understood that the device is susceptible of considerable modification therein, and I, therefore, reserve the privilege of resorting to all such legitimate changes as may be fairly embodied within the spirit and scope of the invention as claimed.

Having thus fully described my invention, what I desire to claim and secure by Letters Patent is:—

A resilient wheel including a hub and rim, said hub consisting of two sections each provided with a series of sockets, the hub sections having semi-circular peripheral recesses communicating with the outer ends of the sockets, inner and outer spoke sections, said outer sections being slidably engaged in the inner sections of the spokes and pivotally connected at their outer ends to the wheel rim, springs arranged in the inner spoke sections for cushioning the sliding movement of the outer sections, said inner spoke sections having pivot rods integrally formed upon one of their ends for engagement in the sockets of the hub sections and also provided with integral disks having convex faces for rocking engagement upon the walls of the opposed recesses in the hub sections.

In testimony whereof I hereunto affix my signature in the presence of two witnesses.

GEORGE N. LARKIN.

Witnesses:
 M. C. LYDDANE,
 D. W. GALL.